(12) United States Patent
Caudle et al.

(10) Patent No.: US 11,738,894 B2
(45) Date of Patent: Aug. 29, 2023

(54) PROCESS AND MACHINE FOR MAKING CLIPLESS CHUB PACKAGE CONTAINING VISCOUS PRODUCT

(71) Applicant: Cryovac, Inc., Charlotte, NC (US)

(72) Inventors: Timothy Gray Caudle, Simpsonville, SC (US); Matthew F. Ellis, Greer, SC (US); Csaba F. Kiss, Simpsonville, SC (US); Joseph E. Moon, Winamac, IN (US); Dwight H. Smith, Simpsonville, SC (US); Michael P. Daly, Taylors, SC (US)

(73) Assignee: Cryovac, LLC, Charlotte, NC (US)

( * ) Notice: Subject to any disclaimer, the term of this patent is extended or adjusted under 35 U.S.C. 154(b) by 547 days.

(21) Appl. No.: 15/761,930

(22) PCT Filed: Sep. 21, 2016

(86) PCT No.: PCT/US2016/052872
§ 371 (c)(1),
(2) Date: Mar. 21, 2018

(87) PCT Pub. No.: WO2017/053418
PCT Pub. Date: Mar. 30, 2017

(65) Prior Publication Data
US 2018/0265231 A1   Sep. 20, 2018

Related U.S. Application Data

(60) Provisional application No. 62/221,347, filed on Sep. 21, 2015.

(51) Int. Cl.
*A22C 11/02* (2006.01)
*A22C 11/04* (2006.01)
(Continued)

(52) U.S. Cl.
CPC ............... *B65B 9/12* (2013.01); *A22C 11/00* (2013.01); *B65B 3/02* (2013.01); *B65B 3/12* (2013.01);
(Continued)

(58) Field of Classification Search
CPC ....... A22C 7/0023; A22C 11/02; A22C 11/04; A22C 11/06; B65B 9/2007
(Continued)

(56) References Cited

U.S. PATENT DOCUMENTS 3,332,204 A   7/1967   Frank
3,340,129 A   9/1967   Grevich
(Continued)

FOREIGN PATENT DOCUMENTS

EP   273507        7/1988
EP   0276628 A1    8/1988
(Continued)

*Primary Examiner* — Thanh K Truong
*Assistant Examiner* — Patrick B Fry
(74) *Attorney, Agent, or Firm* — Jason R. Womer

(57) ABSTRACT

A cyclic packaging process, such as VFFS or HFFS, packages a product with a viscosity of ≥100,000 centipoise without leaving substantial air pockets in the package, by utilizing a means (38) for restricting upstream flow of viscous product in the strand of tubing (24). The result is that packages of uniform weight of the viscous product can be made without substantial air pockets therein, and without having to use metal clips. An apparatus (10) for carrying out the process is disclosed.

8 Claims, 14 Drawing Sheets

(51) Int. Cl.
  *A22C 11/06* (2006.01)
  *B65B 3/12* (2006.01)
  *B65B 3/14* (2006.01)
  *B65B 3/16* (2006.01)
  *B65B 9/12* (2006.01)
  *B65B 9/213* (2012.01)
  *B65B 51/30* (2006.01)
  *B65B 61/06* (2006.01)
  *B65B 9/20* (2012.01)
  *B65B 9/207* (2012.01)
  *A22C 11/00* (2006.01)
  *B65B 3/02* (2006.01)
  *B65B 41/12* (2006.01)

(52) U.S. Cl.
  CPC .............. *B65B 3/14* (2013.01); *B65B 3/16* (2013.01); *B65B 9/2007* (2013.01); *B65B 9/207* (2013.01); *B65B 9/213* (2013.01); *B65B 41/12* (2013.01); *B65B 51/303* (2013.01); *B65B 61/06* (2013.01)

(58) Field of Classification Search
  USPC .................... 53/551; 452/42, 45; 141/10
  See application file for complete search history.

(56) References Cited

U.S. PATENT DOCUMENTS

| | | | | |
|---|---|---|---|---|
| 4,079,662 A * | 3/1978 | Puccetti | ............... | B65B 9/2014 493/203 |
| 4,127,976 A * | 12/1978 | Jablonski | ................. | B65B 3/12 53/450 |
| 4,212,894 A * | 7/1980 | Franzen, Jr. | ........... | A23L 3/3463 426/332 |
| 4,215,524 A * | 8/1980 | Saylor | .................... | B65B 9/023 53/554 |
| 4,321,728 A * | 3/1982 | Marz | ...................... | A22C 11/02 138/118.1 |
| 4,384,442 A * | 5/1983 | Pendleton | ......... | B29C 66/73921 53/554 |
| 4,437,209 A * | 3/1984 | Duroyon | ............ | A22C 11/0245 452/32 |
| 4,438,545 A * | 3/1984 | Kupcikevicius | ... | A22C 11/0218 452/32 |
| 4,529,472 A | 7/1985 | Hsu | | |
| 4,572,839 A * | 2/1986 | Guitteny | ................ | A23K 10/20 426/646 |
| 4,649,602 A * | 3/1987 | Kupcikevicius | ... | A22C 11/0245 452/33 |
| 4,656,818 A * | 4/1987 | Shimoyama | ........ | B29C 66/0342 53/374.4 |
| 4,719,741 A | 1/1988 | Mabry | | |
| 4,809,485 A * | 3/1989 | Nielsen | .................. | B65B 39/00 53/503 |
| 4,999,974 A | 3/1991 | Kovacs | | |
| 5,152,712 A * | 10/1992 | Nausedas | ........... | A22C 11/0209 452/33 |
| 5,241,804 A * | 9/1993 | Tsuruta | .................... | B65B 9/12 53/504 |
| 5,463,851 A | 11/1995 | Nagai | | |
| 5,937,614 A * | 8/1999 | Watkins | .................. | B29C 65/18 53/79 |
| 7,546,722 B2 * | 6/2009 | Tsuruta | .................. | B29C 65/18 53/375.3 |
| 8,539,740 B2 * | 9/2013 | Tsuruta | .................. | B29C 65/18 53/375.3 |
| 2012/0168025 A1 | 7/2012 | Cerveny | | |
| 2015/0140190 A1 * | 5/2015 | Cully | ..................... | A23L 13/60 426/512 |

FOREIGN PATENT DOCUMENTS

| | | |
|---|---|---|
| EP | 661209 | 7/1995 |
| EP | 2243713 A1 | 10/2010 |
| FR | 2547278 A1 | 12/1984 |
| GB | 2016401 A | 9/1979 |
| GB | 2178999 A | 2/1987 |

* cited by examiner

PROCESS AND MACHINE FOR MAKING CLIPLESS CHUB PACKAGE CONTAINING VISCOUS PRODUCT

BACKGROUND

For several decades, form-fill-and-seal machinery has been used for packaging flowable products, including liquids, semi-liquid, and paste-like products. Form fill and seal equipment includes vertical form-fill-and-seal (VFFS) equipment and processes as well as horizontal form-fill and seal equipment and processes.

Form-fill-and-seal packaging uses a flat flexible film rollstock, rather than pre-formed bags or casings. This saves conversion costs and allows the same machine to produce a variety of different package sizes. The flow path of the rollstock film and the product to be packaged move in essentially the same direction, i.e., horizontally in a horizontal form-fill-and-seal process, or downward vertically in a vertical form-fill-and-seal process. In each process, the flat film is directed around a forming collar immediately following which the longitudinal edges of the flat film are sealed together with a fin seal or a lap seal, resulting in a longitudinally heat sealed tubing.

In the vertical form-fill-seal arrangement, flexible packaging material is fed from a rollstock to a tube former where a tube is fashioned from the sheet material into a vertically-oriented, upwardly-open tube having overlapping longitudinal edges. These overlapping edges are subsequently sealed together longitudinally (to form a lap seal or a fin seal), by means well known in the art. Thereafter, the downstream end of the longitudinally sealed tubing is sealed together with a transverse seal to close a downstream end of the tubing.

The sealed tubing is then filled with a measured quantity of the product to be packaged. A second transverse heat sealing operation, typically performed after the filled tube has been downwardly advanced, completes enclosure of the product. Simultaneously with or shortly after the second transverse heat sealing step, the tube is transversely severed by cutting means in a space between the vertically spaced apart pair of transverse heat seals, and the unit package moves off down the packaging stream separate from the remainder of the film. Thereafter, the tube is downwardly advanced and the cycle is successively repeated so as to form a multiplicity of individually packaged products.

Many, if not most vertical form-fill-and-seal machines, have a transverse sealing mechanism which simultaneously forms two transverse heat seals across the longitudinally sealed tubing. The two transverse heat seals may be spaced apart by a relatively short distance, with a cutting mechanism disposed for transversely cutting the film tubing in the short distance between the two transverse heat seals. Alternatively, the sealing device can make a single, relatively wide transverse heat seal and the cutting mechanism may transversely cut across the wide seal leaving a hermetic seal across each of the two new sealed tubing ends prepared by the transverse cut across the wide seal.

Products which readily flow under the force of gravity, e.g., liquids having a viscosity of from 0.1 to 50,000 centipoise, readily flow downward to make packages of uniform weight in a vertical form-fill-and-seal process. However, products which do not readily flow under the force of gravity, e.g., products having a viscosity of at least 100,000 centipoise, such as ground meat, must be pumped into the tubing. Upon entering the tubing from the downstream end of the pumping conduit, such products do not fill the entirety of the longitudinally sealed tubing, but rather leave air pockets in the product because the product does not flow to fill in the volume within the tubing. As a result, it has been found that with form-fill-and-seal processes, viscous products which do not readily undergo flow under the force of gravity do not produce packages of uniform weight. This is problematic because of the need to label each package with the same weight. It is also not desirable to have pockets of air inside the closed package.

SUMMARY

A modified form-fill-and-seal apparatus and process has been invented for the making of packages having uniform product weight wherein the product has a viscosity of at least 100,000 centipoise does not flow in a manner to displace the air inside the tubing. The apparatus can be used to make a stream of packages of uniform product weight.

A first aspect is directed to a cyclical process for packaging a viscous product in a clipless package, comprising: (A) forwarding a flat film from a rollstock, the flat film having a first lateral edge and a second lateral edge; (B) passing the flat film over a forming collar to configure the film into a tubing; (C) heat sealing together first and second portions of the flat film with a longitudinal heat sealer to form a longitudinally sealed tubing, the first and second portions being along the first and second lateral edges, respectively, with the forming collar having a first passageway therethrough; (D) forwarding the longitudinally sealed tubing to a transverse heat sealer and a transverse tubing cutter; (E) heat sealing across the longitudinally sealed film tubing with a transverse heat sealer, to make a package bottom transverse heat seal;

(F) pumping the viscous product through a supply pipe extending through the first passageway, the supply pipe having a downstream end inside the longitudinally sealed film tubing, the viscous product emerging from the downstream end of the supply pipe and into the tubing, the viscous product having a viscosity of ≥100,000 centipoise at standard conditions; (G) filling a portion of the longitudinally sealed film tubing with the viscous product during the pumping of the viscous product into the longitudinally sealed film tubing, the viscous product filling the tubing above the package bottom transverse heat seal to a point upstream of the downstream end of the supply pipe so that the downstream end of the supply pipe is submerged in the viscous product in order to minimize trapped air within the viscous product inside the film tubing; (H) restricting upstream movement of the viscous product at a point upstream of the downstream end of the supply pipe but downstream of the longitudinal heat sealer, the restricting being carried out by providing a means for restricting upstream flow of viscous product, with the means for restricting assisting in (i) minimizing air pockets inside the portion of the tubing filled with the viscous product, and (ii) minimizing the weight variation between a plurality of packaged products made using the tubing; (I) squeezing a meat-filled portion of the tubing with a pair of squeeze rollers, the squeeze rollers being moveable toward and away from the viscous product-filled tubing, the squeeze rollers contacting the viscous product-filled tubing between the downstream end of the supply pipe and the transverse heat sealer, the squeeze rollers being moved toward and contacting the outer surface of a meat-filled portion of the tubing and squeezing the viscous product-filled tubing into a lay-flat configuration with no viscous product between the lay-flat sides of the tubing where the squeeze rollers are in nip relationship, the squeeze rollers separating the viscous product into a package portion of viscous product downstream of the squeeze rollers, and a supply portion of viscous product upstream of the squeeze rollers; (J) forwarding the tubing while the squeeze rollers are in nip relationship with the tubing in lay-flat configuration between the squeeze rollers, to provide a portion of the tubing in lay-flat configuration below the squeeze rollers but above a package portion of viscous product which is in contact with the first transverse heat seal; (K) making a second transverse heat seal and a third transverse heat seal in the portion of the tubing in lay-flat configuration below the squeeze rollers but above the package portion of viscous product in the portion of the tubing below the squeeze rollers; (L) making a transverse cut across the tubing between the second transverse heat seal and the third transverse heat seal, thereby disconnecting a first viscous product-filled package from a remainder of the tubing; (M) moving the squeeze rollers away from the film tubing, with the supply portion of viscous product moving toward and contacting the third heat seal, with the supply portion of the viscous product being replenished by pumping additional viscous product through the supply pipe; and (N) repeating a cycle of steps (F) through (M) in the making of a second package and the preparation of a third package.

In an embodiment, the means for restricting upstream flow of viscous product comprises a first restriction roller in nip relationship with a second restriction roller, with the lay-flat tubing therebetween, with at least one of the restriction rollers having a section of reduced diameter to allow passage of the supply pipe between the restriction rollers while the restriction rollers are in nip relationship. In an embodiment, the first and second restriction rollers are of the same diameter and wherein each has a section of reduced diameter to allow the supply pipe to pass therebetween.

In an embodiment, at least one of the restricting rollers is moveable toward and away from the lay-flat tubing so that if any viscous product squeezes upstream past the restriction rollers, the restriction rollers can be moved away from the lay-flat film tubing and allow the viscous product upstream of the restriction rollers to be forwarded as the film tubing is forwarded.

In an embodiment, the means for restricting upstream flow of viscous product comprises an internal product blocker extending around the supply pipe, the product blocker is shaped to mimic the shape of the film tubing. In an embodiment, the product blocker is in a fixed position. In an embodiment, the product blocker is free to float along a support. In an embodiment, the support is the supply pipe. In an embodiment, the support is a pipe through which the supply pipe passes. In an embodiment, the product blocker is free to float along the support between a lower limit and an upper limit. In an embodiment, the product blocker has an outer perimeter approximately twice the lay-flat width of the tubing.

In an embodiment, the means for restricting upstream flow of viscous product is a product stuffer that moves the product towards the bottom of the tube. In an embodiment, the product stuffer comprises a plunger. In an embodiment, the plunger is activated by a member selected from the group consisting of air cylinder, spring, hydraulic piston, and electromechanical device.

In an embodiment, the film tubing travels vertically downward from the forming collar during packaging of the viscous product.

In an embodiment, the film tubing travels horizontally from the forming collar during packaging of the viscous product.

In an embodiment, the film has a uniform width.

In an embodiment, the viscous product is pumped intermittently during the process. In an embodiment, pumping is carried out only during periods in which the film is being forwarded.

In an embodiment, the viscous product is pumped continuously during the process.

In an embodiment, the downstream end of the supply pipe remains submerged in the viscous product throughout the repeating of the cycle of steps (F) through (M) in the making and severing of the second package and the preparation of the third package.

In an embodiment, the rotation of at least one of the squeeze rollers is powered.

A second aspect is directed to an apparatus for packaging a viscous product in a clipless package. The apparatus comprises: (A) a forming collar for configuring a flat film into a tubing configuration, the forming collar providing a first passageway therethrough; (B) a longitudinal heat sealer for making a longitudinal seal of the flat film to itself while the flat film is in the tubing configuration, to form a longitudinally sealed tubing; (C) first and second pairs of powered wheels in nip relationship for forwarding the sealed tubing, with a second passageway between the first and second pairs of powered wheels; (D) an upper transverse heat sealer for making a package bottom transverse seal, and a lower transverse heat sealer for making a package top transverse seal; (E) a transverse tubing cutter between the upper transverse heat sealer and the lower transverse heat sealer; (F) a means for restricting upstream flow of viscous product pumped into the tubing, the means for restricting upstream flow of the viscous product being between the powered rollers and the upper transverse heat sealer, the means for restricting upstream flow of the viscous product providing a third passageway therethrough, (G) a supply pipe for pumping viscous product into the sealed tubing, the supply pipe extending through the first passageway, the second passageway, and the third passageway, the supply pipe having an open downstream end which is downstream of the means for restricting the flow of the viscous product; (H) a pair of squeeze rollers transverse to the sealed tubing, the squeeze rollers being moveable toward and away from the tubing, the squeeze rollers being downstream of the downstream end of the supply pipe and upstream of the upper transverse heat sealer, the squeeze rollers being movable into nip relationship with one another with the longitudinally sealed tubing therebetween.

In an embodiment, the means for restricting upstream flow of viscous product comprises a first restriction roller in nip relationship with a second restriction roller, with at least one of the restriction rollers having a section of reduced diameter to provide the third passageway while the restriction rollers are in nip relationship. In an embodiment, the first and second restriction rollers are of the same diameter and the third passageway is provided by a first section of reduced diameter in the first restriction roller in combination with a second section of reduced diameter in the second restriction roller. In an embodiment, at least one of the restricting rollers is moveable toward and away from the lay-flat tubing so that if any viscous product squeezes upstream past the restriction rollers, the restriction rollers can be moved out of the nip relationship relative to one another to allow the viscous product upstream of the restriction rollers to be forwarded as the sealed tubing is forwarded.

In an embodiment, the means for restricting upstream flow of viscous product comprises an internal product blocker extending around the supply pipe with a surface providing the third passageway, the product blocker having a size and shape corresponding with a cross-sectional shape of the longitudinally sealed film tubing when the tubing is filled with meat product. In an embodiment, the product blocker is present on a support member. In an embodiment, the support member is the supply pipe. In an embodiment, the support member is a product blocker support pipe, and third passageway is a passageway through the product blocker support pipe. In an embodiment, the product blocker is free to float relative to the supply pipe, between a lower limit and an upper limit. In an embodiment, the product blocker is in a fixed position above the downstream end of the supply pipe. In an embodiment, the product blocker has an outer perimeter approximately twice the lay-flat width of the tubing.

In an embodiment, the means for restricting upstream flow of viscous product is a product stuffer that moves the product towards the bottom of the longitudinally sealed tubing.

In an embodiment, the product stuffer comprises a plunger. In an embodiment, the plunger comprises a plunger actuator comprising a member selected from the group consisting of pneumatic actuator, hydraulic actuator, electromechanical actuator, and spring.

In an embodiment, the apparatus is designed for downward vertical movement of the film as it is longitudinally sealed, filled with viscous product, and transversely sealed.

In an embodiment, the apparatus is designed for horizontal movement of the film as it is longitudinally sealed, filled with viscous product, and transversely sealed.

In an embodiment, the film tubing travels horizontally from the forming collar during packaging of the viscous product.

In an embodiment, the apparatus further comprises a pump for pumping the viscous product through the supply pipe.

In an embodiment, the rotation of at least one of the squeeze rollers is powered.

DETAILED DESCRIPTION

As used herein, the terms rollers and wheels are used interchangeably. Both are rotatable. In an embodiment, a roller may have an axle length at least as long as its diameter. In an embodiment, a wheel may have an axle length from 1% to 50% of its diameter.

As used herein, the phrase "nip relationship" refers to wheels and rollers which either contact one another directly at a point of contact, or are in indirect contact with one another as the rollers or wheels are in direct contact with the same article (such as a film or film tubing) therebetween, or with a set of articles in contact with each other therebetween, such that the article(s) move as the rollers or wheels are rotated together while in nip relationship. The rotation of rollers and wheels in nip relationship is used to forward the article(s) between the rollers or wheels. Power can be provided to one or both of the rollers or wheels in nip relationship.

As used herein, the term "clipless" refers to a package made from a tubing with end seals which do not comprise metal clips. For several decades, metal clips have been used to provide hermetic seals at each end of a chub package made from a film tubing, e.g., the packaging of ground meat product (e.g., sausage) in a chub package. It is desirable to remove metal clips from a package, particularly a package containing a food product, as the metal clip has the possibility of entering the food product upon opening the package.

Although it is known that all materials exhibit some degree of flow over time, as used herein the phrase "viscous" is applied to products which do not readily flow under the action of gravity at the conditions under which the product is packaged. Such products have a viscosity of ≥100,000 centipoise under standard conditions (22° C., 1 atm pressure, 50% relative humidity). For example, water is readily flowable as it has a viscosity of about 1 centipoise at standard conditions, whereas ground meat (such as hamburger meat) has a viscosity of ≥100,000 centipoise under standard conditions.

As used herein, the phrase "flat film rollstock" refers to a flexible film wound up onto a roll. The flat film can be unwound from the roll to provide the film as a strand which can be reconfigured and modified to form a package. In an embodiment, the flat film has a constant width.

As described herein, the "means for restricting upstream flow of the viscous product" is a means for limiting the amount of upstream flow of the viscous product in the longitudinally sealed film tubing once the viscous product exits the discharge end of the supply pipe. The phrase "upstream flow" is relative to the end of the supply pipe which supplies the viscous product to the longitudinally sealed tubing.

Figure 1:
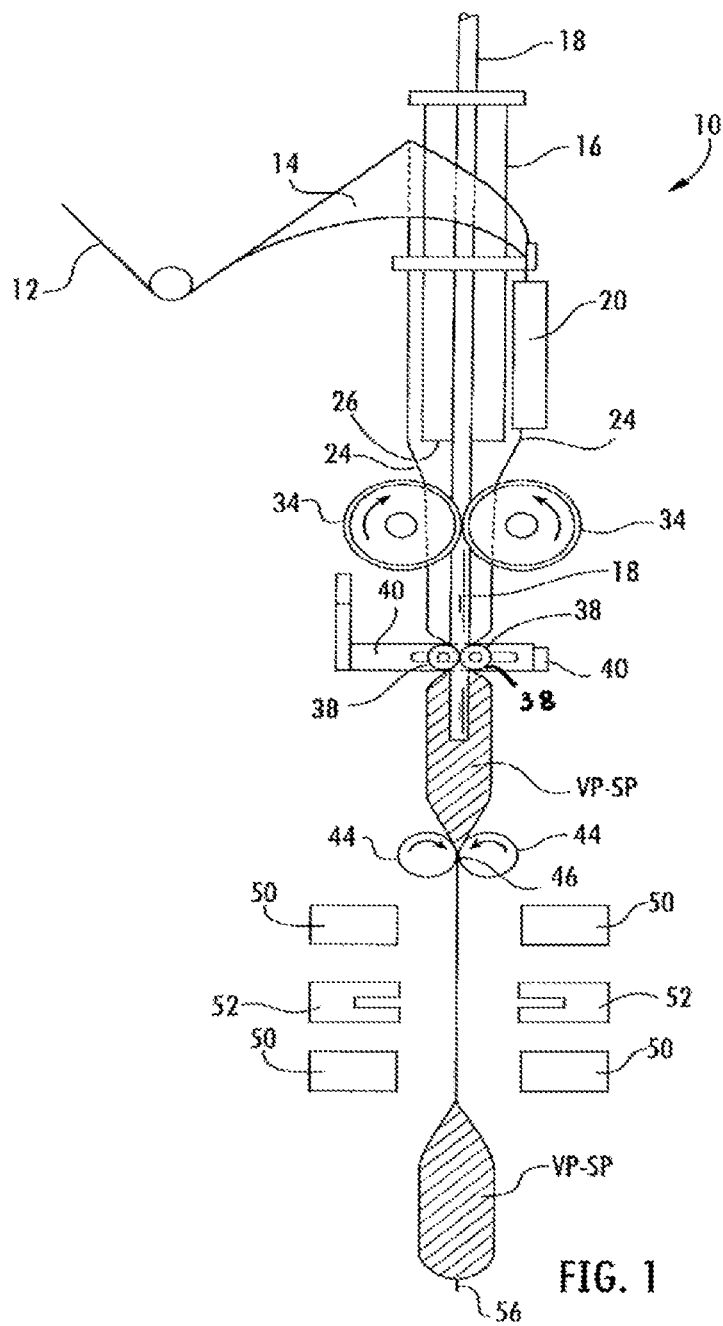
FIG. 1 is a side elevation view of a schematic of a first working embodiment of a VFFS apparatus in a stage of a cyclic package forming and filling and sealing process.
Figure 2:
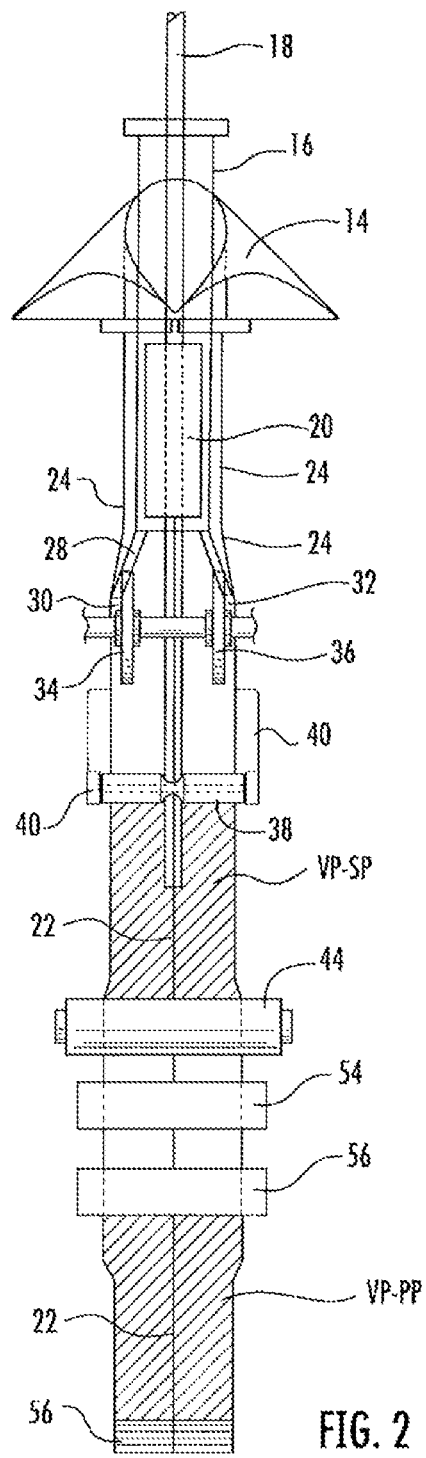
FIG. 2 is a front elevation view of the schematic of the VFFS apparatus and process stage illustrated in FIG. 1.

FIGS. 1 and 2 illustrate side and front views, respectively, of a schematic of a working apparatus and process utilizing a novel vertical form-fill-and-seal packaging machine 10, in use, i.e., at an intermediate step in the cyclic package-forming and package-filling process. In FIGS. 1 and 2, packaging machine 10 is supplied with flat film 12 which passes over, around, and through forming collar 14 and thereafter downwardly around forming pipe 16. Supply pipe 18 passes through forming pipe 16. Both forming pipe 16 and supply pipe 18 pass through a first passageway through forming collar 14. Upon passing around forming collar 14 and through a first passageway which is through forming collar 14, flat film 12 is conformed into a tubular configuration around forming pipe 16, with overlapping edge regions. Heat sealer 20 is used to produce a longitudinal seal 22 of edge regions to one another (as a lap seal or a fin seal), with the resulting longitudinally sealed tubing 24 being forwarded downward past lower end 26 of forming pipe 16.

After longitudinally sealed tubing 24 moves vertically downward and below lower end 26 of forming pipe 16, sealed tubing 24 is spread into a more flattened configuration by spreader bar 28 (but still has supply pipe 18 therein, as illustrated in FIGS. 1 and 2), forming first flattened edge region 30 and second flattened edge region 32. First flattened edge region 30 is passed between and through first pair of drive wheels 34 in nip relationship (see FIG. 1). Second flattened edge region 32 is passed between and through second pair of drive wheels 36 also in nip relationship. Drive wheel pairs 34 and 36 are powered by a motor, and pull flat film 14 around, over, and through forming collar 14, and also pull sealed tubing 24 downwardly from sealer 20, and forward sealed tubing 24 into further downstream operations in which longitudinally sealed tubing 24 is transversely sealed and filled with product. Additional film forwarding means (not illustrated), as known to those of skill in the art, may optionally be used to assist in forwarding flat film 12 upstream of forming collar 14.

Supply pipe 18 extends into longitudinally sealed tubing 24 and through a second passageway between first pair of drive wheels 34 and second pair of drive wheels 36, as drive wheel pairs 34 and 34 only contact tubing edge regions 30 and 32, respectively. After longitudinally sealed tubing 24 passes through the nips between respective pairs of drive wheels 34 and 36, longitudinally sealed tubing 24 continues downward through a nip between product backflow blocking rollers 38 mounted on frame 40.

Figure 3A:
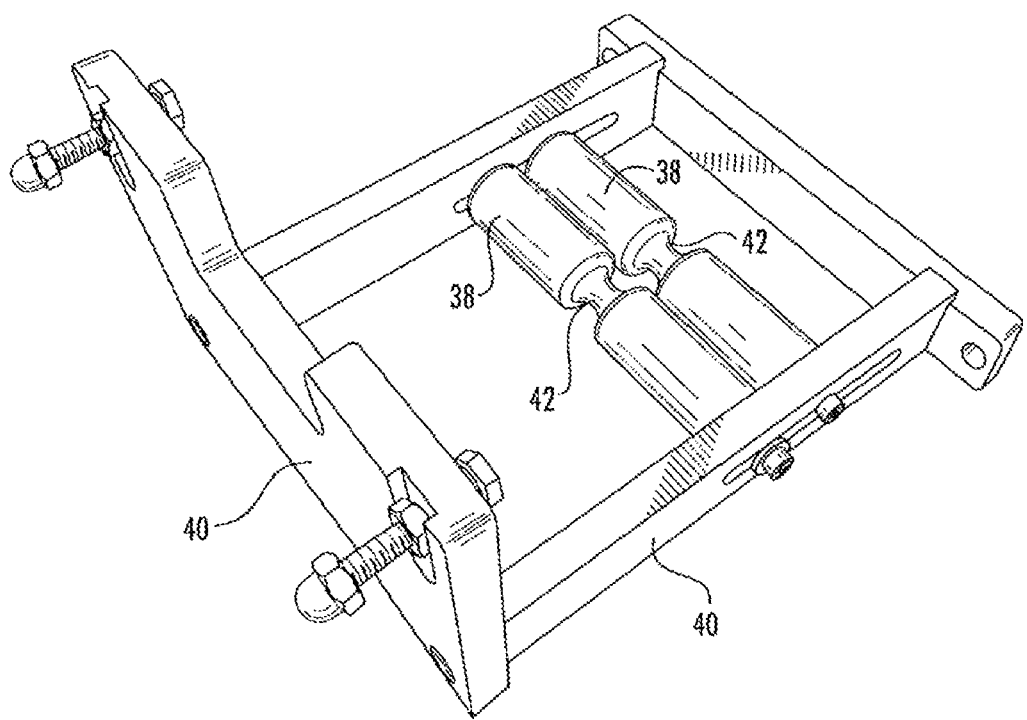
FIG. 3A is an enlarged perspective view of a set of product backflow blocking rollers in a mounting frame, used in the apparatus of FIGS. 1 and 2.
Figure 3B:
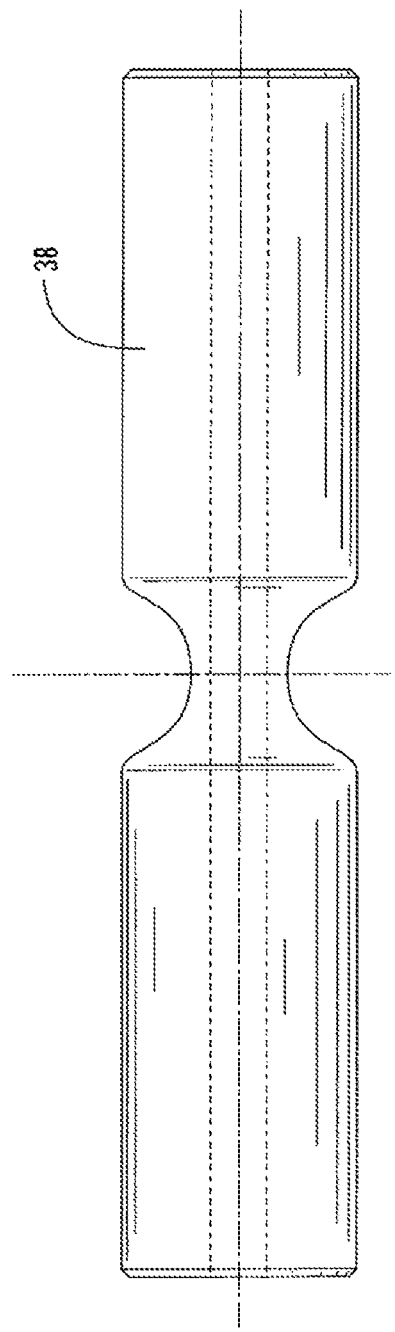
FIG. 3B is an enlarged perspective view of a single product backflow blocking roller from FIG. 3A.

As illustrated FIGS. 3A and 3B, backflow blocking rollers 38 are at a stage of the process cycle in which they are in nip relationship to one another. Backflow blocking rollers 38 have reduced diameter section 42 which provides a third passageway through which supply pipe 18 extends. Blocking rollers 38 are mounted in frame 40, which is slotted to provide lateral movement of backflow blocking rollers 38, i.e., so that rollers 38 can be separated from one another, i.e., disengaged from being in nip relationship with one another for one or more portions of the points of the cyclic process. In the event that any of the viscous product VP squeezes upstream of blocking rollers 38, disengagement of the nip relationship between blocking rollers 38 allows the escaping viscous product VP to move downstream with the forwarding of the longitudinally sealed tubing 24 as the process continues. One or more of the various means for lateral movement of blocking rollers 38 into and out of nip relationship are not (and need not) be illustrated or described, as can be accomplished through the use of ordinary skill, using such components as bias springs, rotatable cams, solenoid valves, pneumatically activated pistons, etc.

In the point in the package-forming and product-packaging cycle illustrated in FIGS. 1 and 2, viscous product VP has been pumped through supply pipe 18 and into tubing 24. A pair of rotationally-powered, forwarding squeeze rollers 44 have been moved laterally, i.e., horizontally, from an initial position beside (but not contacting) the product-filled tubing, to a final position as illustrated in FIGS. 1 and 2, i.e., in nip relation with one another. The lateral movement of squeeze rollers 44 into contact with longitudinally sealed tubing 24 filled with viscous product VP, displaces viscous product VP from that portion of sealed tubing 24 reconfigured into lay-flat configuration by squeeze rollers 44 moving into nip relationship with one another. That is, viscous product VP is displaced both upward and downward within the tubing by laterally advancing squeeze rollers 44, which have collapsed the tubing into a lay-flat configuration at the location of the nip 46 between squeeze rollers 44. The coming together into nip relation of squeeze rollers 44 divides the viscous product into two portions: viscous product-supply portion VP-SP above squeeze rollers 44, and viscous product-package portion VP-PP below squeeze rollers 44.

In the stage of the process cycle illustrated in FIGS. 1 and 2, longitudinally sealed tubing 24 has been forwarded after squeeze rollers 44 came into nip relationship with one another. The forwarding of sealed tubing 24 caused: (i) viscous product-package portion VP-PP to move downward (by force of gravity) while squeeze rollers 44 rotate (in the direction indicated in FIG. 1) while remaining in nip relationship with one another, leaving a section 48 of longitudinally sealed tubing 24 in lay-flat configuration with essentially no viscous product VP therein.

While section 48 of sealed tubing 24 is in lay-flat configuration, it is also in a configuration suited to transverse heat sealing and transverse cutting, as the lay-flat sides of the tubing are in close proximity to one another, and the viscous product is not present to interfere with heat sealing the tubing to itself or severing the tubing. Although a thin film of grease may be present on the inside of surface of section 48 of sealed tubing 24 in the event that ground meat product is being packaged, a heat seal can be readily made through such a thin level of contamination.

Blocks 50 are a schematic representation of a laterally moveable heat sealer for making two transverse heat seals, or one wide heat seal, across tubing 24 in lay-flat configuration. Such heat sealing forms a top transverse seal closing the package below, as well as a bottom seal for the package above. Various heat sealers are known to those of skill in the art for making two or more narrow seals or a wide heat seal of tubing 24 while it is in lay-flat configuration as illustrated in FIGS. 1 and 2.

After the pair of heat seals (or a single wide heat seal) is made by the heat sealer represented by blocks 50 in the process stage illustrated in FIGS. 1 and 2, the resulting heat seal(s) can be forwarded down to a location centered between blocks 52 in the next step of the process cycle. Blocks 52 schematically represent laterally-moveable cutting means 52 which can be laterally-moved into contact with and cut across the entirety of tubing 24 while sealed into lay-flat configuration, so that the lowermost seal (or seal portion) forms the upper closing seal of the package containing viscous product-package portion VP-PP, and the uppermost seal (or seal portion) forms the lower seal of the next package to be filled with a portion of the viscous product-supply portion.

As illustrated in FIGS. 1 and 2, the packaged product which will contain the viscous product-package portion already has a lower heat seal 56 seal as a result of a prior process cycle. Once the tubing is severed by cutting means 52, the resulting packaged product is separated from strand of tubing 24, and proceeds onward to, for example, boxing and shipping. Because the packaged product has lay-flat tubing extending from each end, the packaged product can be mashed into a flatter configuration with the product moving outward toward the lower seal 56 and the upper seal (not shown in FIGS. 1 and 2).

Figure 4:
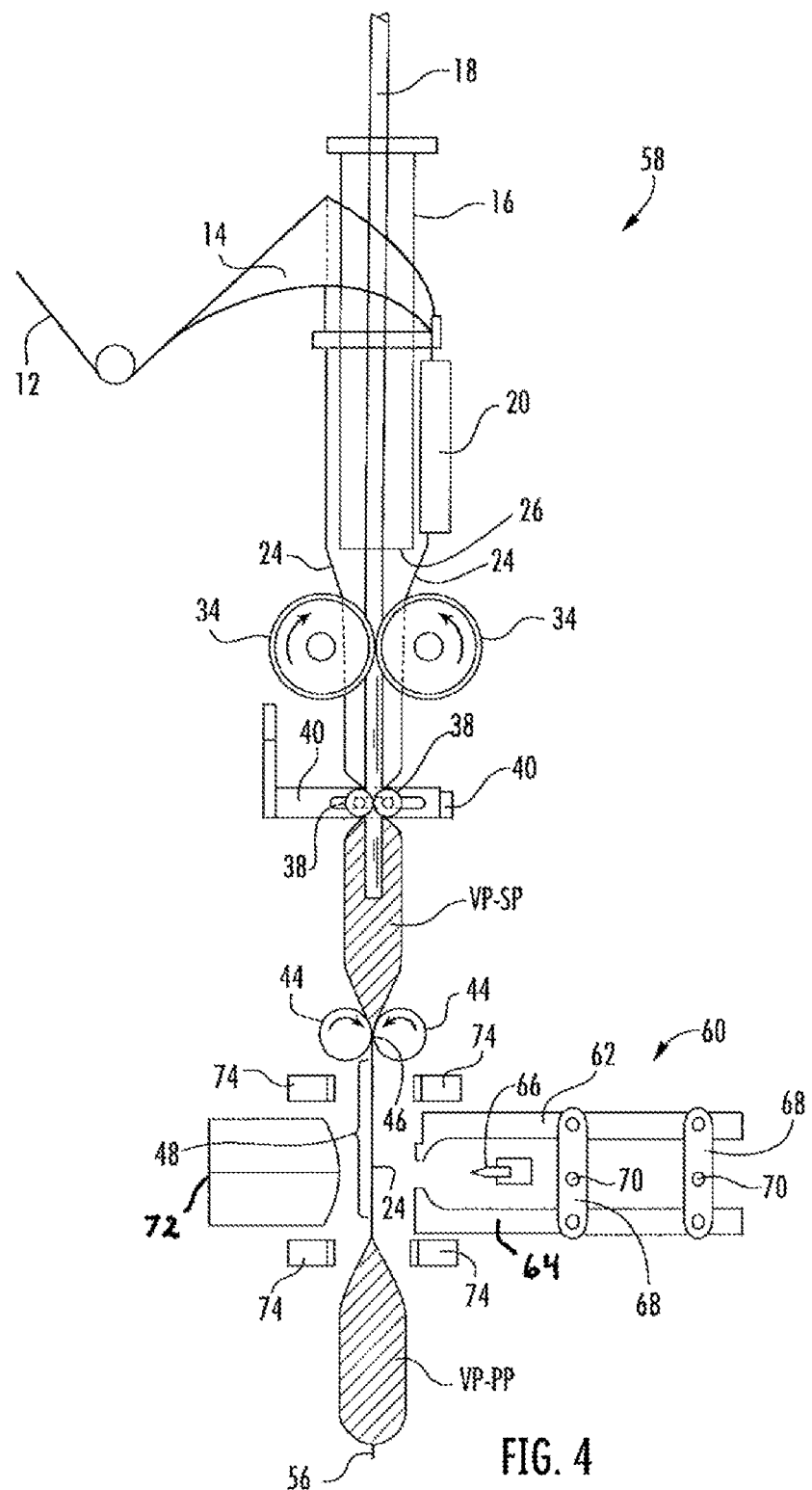
FIG. 4 is a side elevation view of a schematic of a second working embodiment of a VFFS apparatus in a stage of a cyclic package forming and filling and sealing process.

FIGS. 4 illustrates a side view of an alternative embodiment of vertical form-fill-seal apparatus 58 of the same general design and operation as the embodiment of FIGS. 1 and 2 except that in place of separate sealer 50 and cutter 52 thereof, the apparatus of FIG. 4 has a combination sealer/cutter assembly 60 which does not require forwarding of longitudinally sealed tubing 24 between making the transverse seal(s) and severing a package from the strand of longitudinally sealed tubing 24.

Combination sealer/cutter assembly 60 is disposed between upper and lower pairs of film support members 74. Sealer/cutter assembly 60 comprises horizontal heater bar 62 for horizontally heat sealing across unfilled, lay-flat portion of longitudinally sealed tubing 24 formed by advancing sealed tubing 24 while squeeze rollers 44 are in nip relationship, horizontal cooling bar 64 for cooling a region heat-sealed by heater bar 62, cutter blade 66 positioned between heater bar 62 and cooling bar 64 for cutting across the heat sealed portion, an bearing blocks 72 disposed in a confronting relationship to heater bar 62, cooling bar 64, and cutting blade 66. Bearing blocks 72 is moveable horizontally and perpendicularly to the vertical direction in which tubular film 24 is fed downwardly.

Heater bar 62 has a heater (not shown) housed in its distal end facing the tubular film 24, and is angularly movably supported on the upper ends of two parallel joint links 68 that are fixedly mounted on respective rotatable shafts 70. Cooling bar 64 is angularly movably supported on the lower ends of joint links 68. Heater bar 62 and cooling bar 64 have their respective distal ends vertically spaced from each other at a sufficient distance to allow cutting blade 66 to pass therebetween when the components of sealer/cutter assembly 60 are positioned as shown in FIG. 4.

At least one of shafts 70 is coupled to a drive source (not shown) so that the shafts 70 can be rotated thereby. When shafts 70 are rotated counterclockwise by the drive source with the bearing blocks 72 displaced toward the longitudinally sealed film tubing 24, cooling bar 64 is retracted away from tubular film 24 and heater bar 62 is moved toward tubular film 24 until heater bar 62 and bearing blocks 72 both press against film tubing 24. Conversely, when shafts 70 are rotated clockwise by the drive source, heater bar 62 is retracted away from film tubing 24 and cooling bar 64 is moved toward film tubing 24 until cooling bar 64 and bearing blocks 72 both press against film tubing 24.

The drive source for rotating shafts 70 may be of any mechanism insofar as it can rotate the shafts 70 reversibly through any desired angle. For example, the drive source may be a stepping motor or a rack-and-pinion mechanism including a pinion fixed to one of the shafts 70 and a rack drivable back and forth by a cylinder and held in mesh with the pinion.

Cutting blade 66 is located vertically between heater bar 62 and cooling bar 64 for movement by a cylinder in a horizontal direction perpendicular to the vertical direction in which the film tubing 24 is fed downwardly.

Bearing blocks 72 comprise two members vertically separated from each other along the horizontal direction in which the cutting blade 66 is movable, the two members being vertically movable toward and away from each other. When the members of bearing blocks 72 are vertically spaced away from each other, a gap is produced therebetween for the cutting blade 66 to enter. Cutting blade 66 is moved through film tubing 24 into the gap between the two vertically spaced members of bearing blocks 72, severing tubular film 24.

Figure 5C:
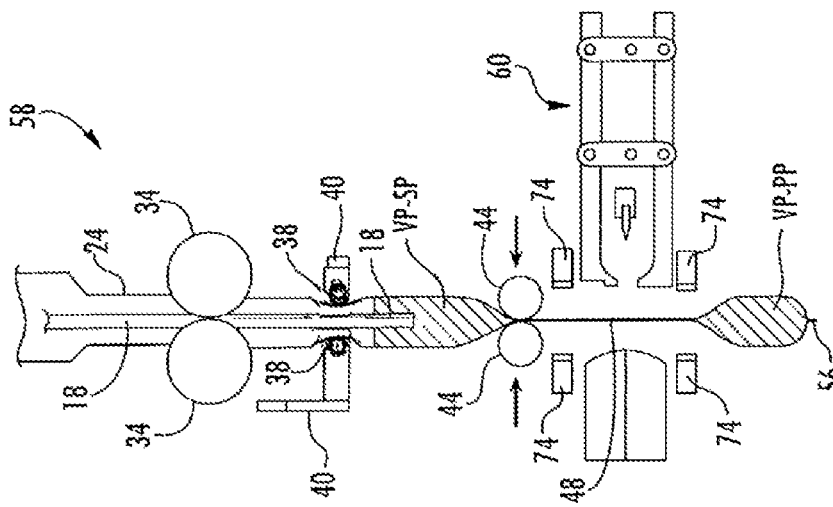
FIGS. 5A through 5I are side elevation views of schematics of the second working embodiment of FIG. 4 in successive states of the package forming, filling, and sealing process, with the stages running the full cycle of the process.
Figure 5B:
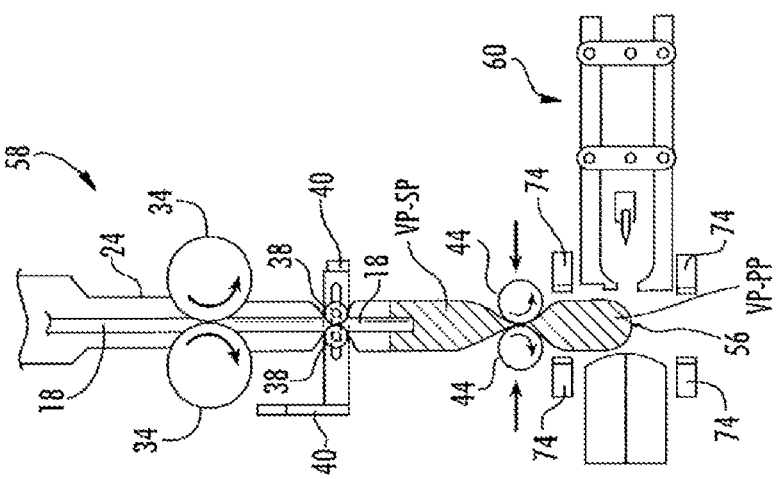
Figure 5A:
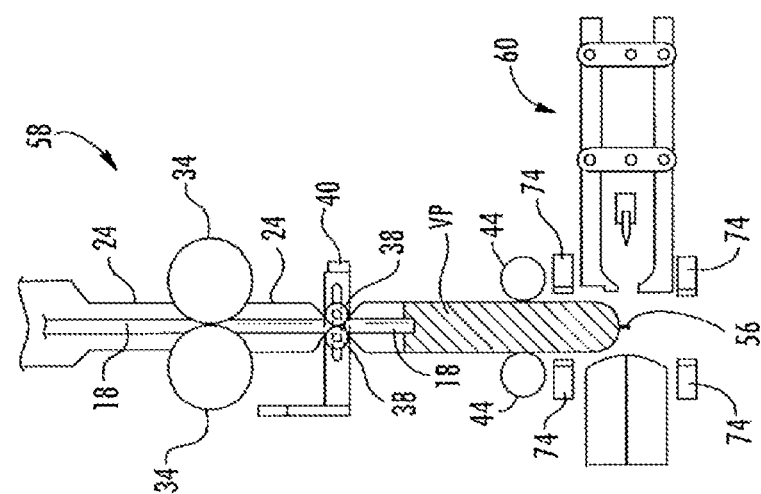

Operation of the vertical-type filling and packaging machine 58 will be described below, beginning at a point in the cyclic process as illustrated in FIG. 5A, in which squeeze rollers 44 and film support members 74 are in an "open" position and sealer/cutter assembly 60 is in a retracted position, film tubing 24 is filled with viscous product VP, and lower end of film tubing 24 has been previously closed by heat-seal 56, and sealer/cutter assembly 60 has already cut off a package (not shown) which has been forwarded downstream. A pump (not illustrated) is pumping viscous product VP through supply pipe 18 and into film tubing 24. Product backflow blocking rollers 38 are in closed position, i.e., in nip relationship to one another, to prevent viscous product VP from backflowing upwardly in film tubing 24.

Next, as shown in FIG. 5B, squeeze rollers 44 are closed, dividing the viscous product into separated viscous product-supply portion VP-SP and viscous product-package portion VS-PP. During this time, the pump can continue pumping viscous product VP through supply pipe 18 and into film tubing 24, and backflow blocking rollers 38 remain in their closed position. However, a little viscous product may be squeeze through blocking rollers 38 and momentarily reside upstream of blocking rollers 38 while blocking rollers 38 are in their closed position.

Next, as shown in FIG. 5C, pairs of drive wheels 34 and 36 and driven squeeze rollers 44 are rotated in the directions indicated by the arrows. The result of this rotation is that film tubing 24 is forwarded downwardly while being squeezed by squeeze rollers 44, thereby producing section 48 of sealed tubing 24 in lay-flat configuration. During this time, backflow blocking rollers 38 are opened a short distance so that any viscous product VP which has squeezed through upstream of blocking rollers travels down through now opened blocking rollers 38 with downwardly moving film tubing 24.

Figure 5D:
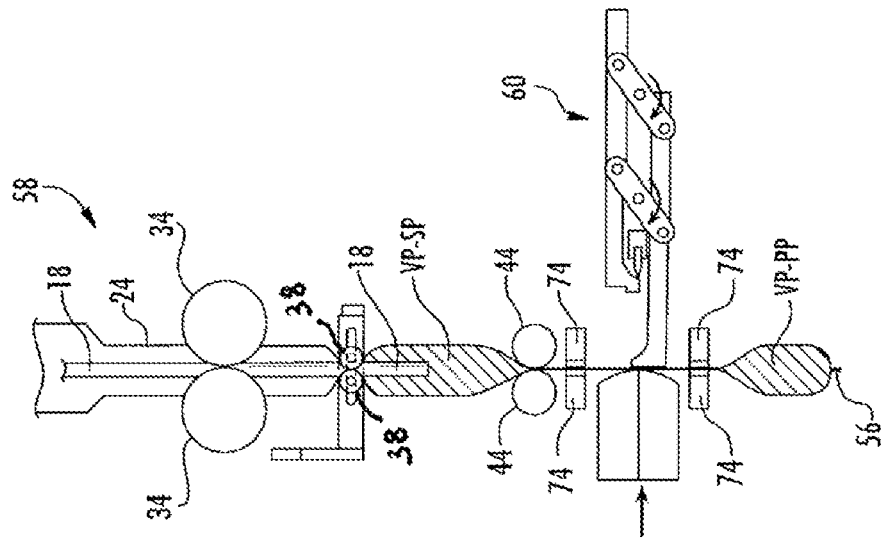

Next, as illustrated in FIG. 5D, after a lower end of section 48 of sealed tubing 24 in lay-flat configuration reaches the lower pair of film support members 74, pairs of drive wheels 34 and 36 and driven squeeze rollers 44 are deactivated to stop the downward movement of sealed tubing 24, whereupon the film support members 74 are closed, i.e., held against sealed tubing 24, as shown in FIG. 5D. At this point in the process cycle, section 48 of sealed tubing 24 in lay-flat configuration is supported by both pairs of support members 74, i.e., at locations both above and below sealer/cutter assembly 60. Moreover, backflow blocking rollers 38 are once again closed (returned to nip configuration) so that viscous product VP being pumped through supply pipe 18 is blocked from traveling upstream past blocking rollers 38.

Figure 5E:
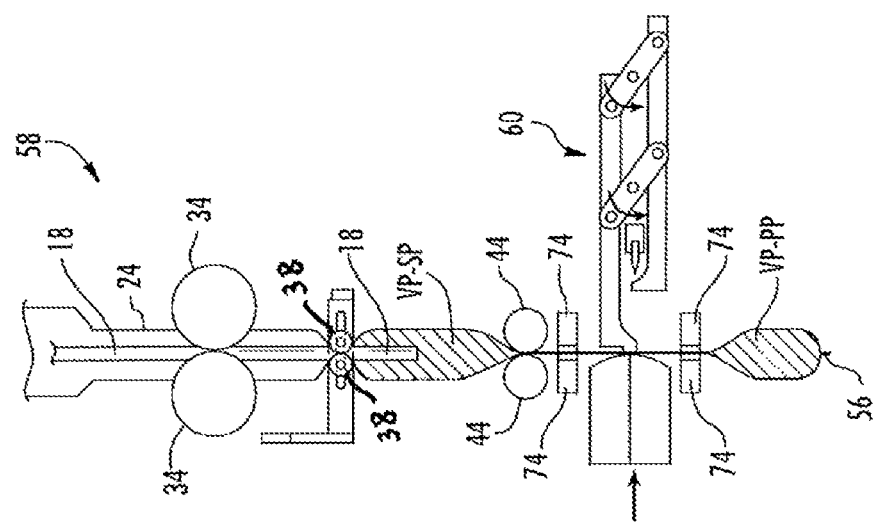

Next, as illustrated in FIG. 5E, after the closing of the backflow blocking rollers 38, and with section 48 of sealed tubing 24 in lay-flat configuration being held by film support members 74, bearing blocks 72 is moved into contact with section 48 of sealed tubing 24, and shafts 70 are rotated counterclockwise. Heater bar 62 is then moved into contact with section 48 of sealed tubing 24, and a portion of section 48 of sealed tubing 24 which is held between bearing blocks 72 and heater bar 62 is pressed and heated until one or more transverse heat seals are formed. Unfilled section 48 of sealed tubing 24 is pressed by heater bar 62 at the same time it is supported by support members 74.

Figure 5F:
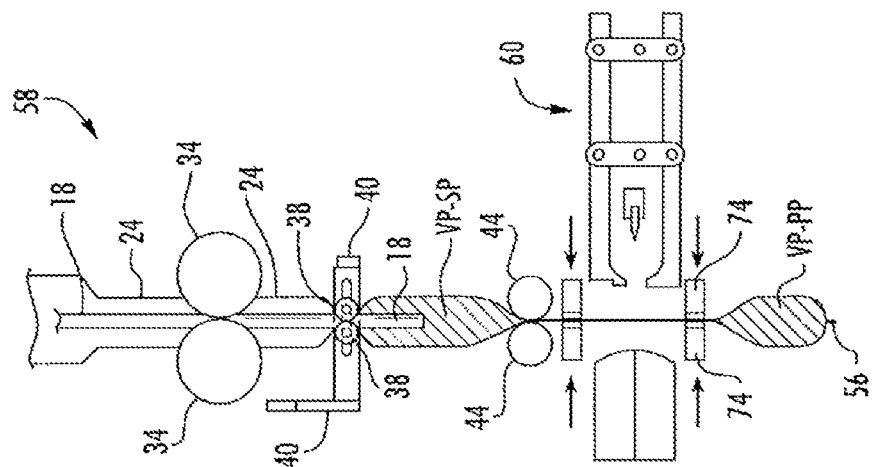

Next, as illustrated in FIG. 5F, immediately after the one or more transverse heat seals are made, and while sealed tubing 24 is held by support members 74, shafts 70 are rotated clockwise, thereby retracting heater bar 62 from sealed tubing 24, while simultaneously moving cooling bar 64 into contact with sealed tubing 24. Heat from the transverse heat seals on film tubing 24 is transferred to cooling bar 64, resulting in the cooling of the heat-sealed portion of film tubing 24. To accelerate the cooling of film tubing 24 by cooling bar 64, the cooling bar 64 may optionally be provided with an internal liquid passage channel for the passage of cooling liquid therethrough for the purpose of enhancing the heat transfer from the heat sealed portion of film tubing 24 to cooling bar 64.

Figure 5I:
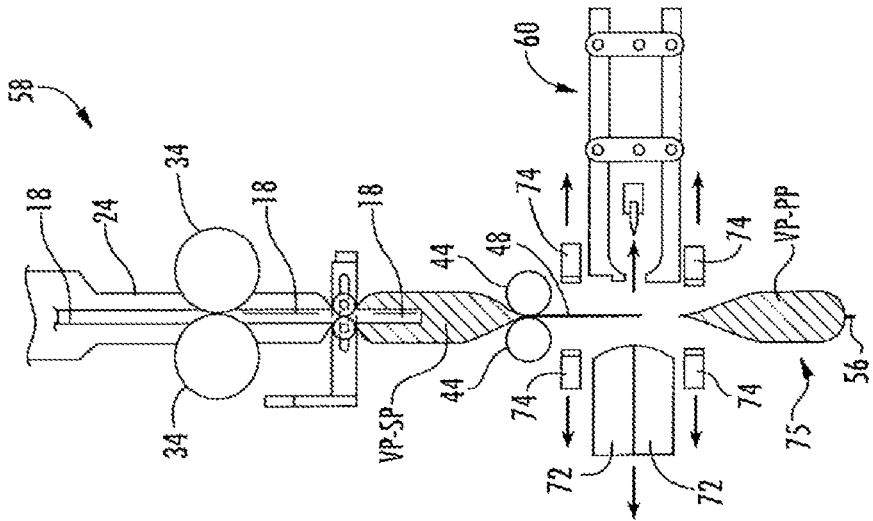
Figure 5H:
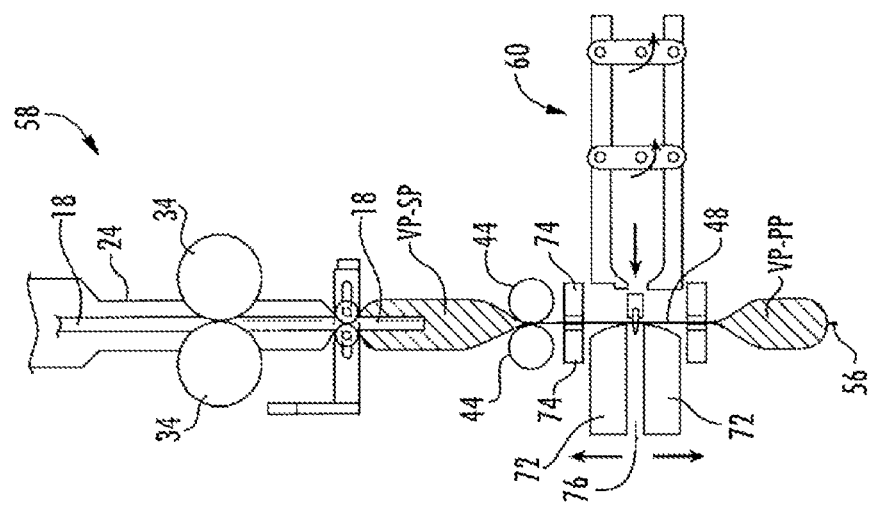
Figure 5G:
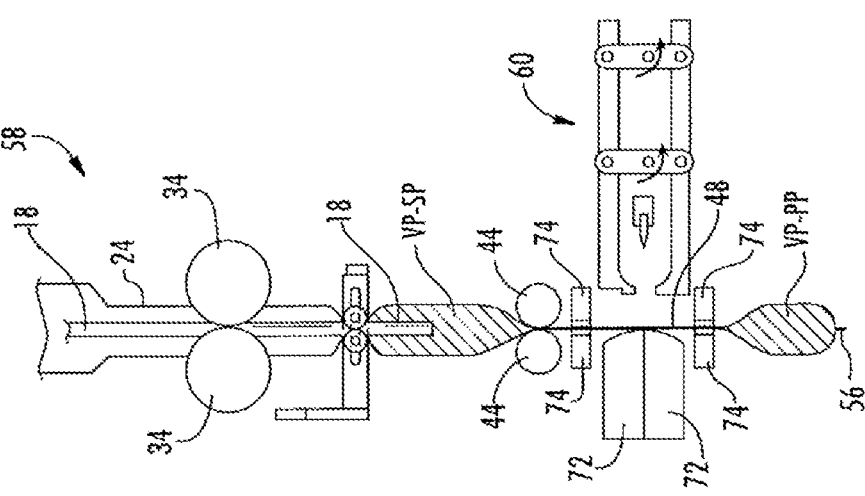

Next, as illustrated in FIG. 5G, once the heat-sealed portion of film 24 is adequately cooled, shafts 70 are rotated counterclockwise until heater bar 162 and cooling bar 64 are returned to their initial position.

Next, as illustrated in FIG. 5H, bearing blocks 72 are opened, i.e., the members thereof are moved away from each other, and cutting blade 66 is moved to and through film tubing 24 and into gap 76 bearing blocks 72, thereby severing film tubing between two heat seals or within one wide heat seal, so that film tubing 24 has a transverse heat seal on each side of the position at which it is transversely severed.

Next, as illustrated in FIG. 5I, after film tubing 24 is severed at the position between the two heat seals or through a wide heat seal, bearing blocks 72 are closed, and bearing blocks 72 and cutting blade 66 are returned to their respective inactive positions, and film support members 74 are opened, i.e., returned to their inactive positions. The return of bearing blocks 74 releases now packaged product 78, allowing it to move downstream separately from film tubing 24.

The process cycle illustrated in FIGS. 5A through 5I is completed by the opening of squeeze rollers 44 as illustrated in FIG. 5A, allowing viscous product-supply portion VP-SP (FIG. 5I) to move downward inside film tubing 24 as more viscous product VP is pumped into film tubing 24, resulting in the apparatus and process configuration illustrated in FIG. 5A. The single cycle of the process and apparatus illustrated by FIGS. 5A through 5I, and as described above, is thereafter successively repeated for each packaged product 78 produced.

As described above, since section 48 of sealed tubing 24 is supported at positions above and below the heat-sealed portion by the film support members 74 after section 48 of sealed tubing 24 is heat-sealed and severed, the heat-sealed portion of film tubing 24 is not subject to the weight of the filling material while the seal remains hot with tubing 24 in a weakened state. As section 48 of sealed tubing 24 is therefore not stretched downwardly by weight of viscous product-package portion VP-PP before the heat-sealed portion is adequately cooled so as to have strength, a single-layer film or thin multilayer film of polyethylene can be used to make film tubing 24.

In as much as longitudinally sealed film tubing 24 is heat-sealed, cooled, and severed without being moved, by successively moving the heater bar 62, the cooling bar 64, bearing blocks 72, and cutting blade 66, film tubing 24 can be severed at the same position in which it is transversely sealed. Moreover, the forwarding of longitudinally sealed film tubing 24 while squeeze rollers 44 are closed produces section 48 of lay-flat tubing substantially free of viscous product VP so that sealing can take place without having to seal through a substantial amount of "contamination" in the seal area. This serves to prevent leaks through the seals and the potential for the rotting of food product in the area of the seals.

Heater bar 62 is provided with a built-in heater (not illustrated). However, the filling and packaging machine may employ an impulse sealer(s) comprising one or more heater bars with one or more ribbon heater(s) such as a nichrome ribbon mounted on its pressing surface, the ribbon heater(s) being energizable for the making of seal(s) across film tubing 24.

The sealing/cutting mechanism 60, and its use in a vertical-form-fill-and-seal apparatus, is described in U.S. Pat. No. 5,463,851, to Nagai, which is hereby incorporated, in its entirety, by reference thereto.

In an embodiment, apparatus 10 is provided with a ribbed seal bar, with a mating surface (on bearing blocks 72, or an alternative mechanism to sealing/cutting assembly 60) having or more layers of non-stick tape (e.g., "TEFLON" tape) adhered to the surface. In an embodiment, apparatus 10 does not have a cooling bar. In an embodiment, the apparatus is provided with a means for enhancing the rate of cooling of the seal by blowing air onto the just-formed seal. Blown air cooling can be provided as disclosed in U.S. Pat. No. 4,719,741, to Mabry, which is hereby incorporated, in its entirety, by reference thereto.

Although the pairs of drive wheels are rotationally powered for the purpose of forwarding the flat film and the film tubing, and can be the primary film drive on the apparatus, in an embodiment one or more additional sets of rollers may be driven to assist in forwarding the film tubing. The squeeze rollers may be driven, at least during a portion of the time they are in contact with the longitudinally sealed film tubing. The backflow restriction rollers may also be driven during that portion of the cycle in which the film tubing is advanced.

Although the process above is described for a vertical-form-fill-and-seal apparatus and process, an alternative apparatus and process utilizes a horizontal-form-fill-and-seal apparatus and process, with the sealed tubing having viscous product therein being supported downstream of the backflow restriction rollers (such as with a conveyor having rollers or an endless belt) and with adequate powered rollers to ensure that the product-filled portion of the film tubing can be forwarded as desired.

Figure 6:
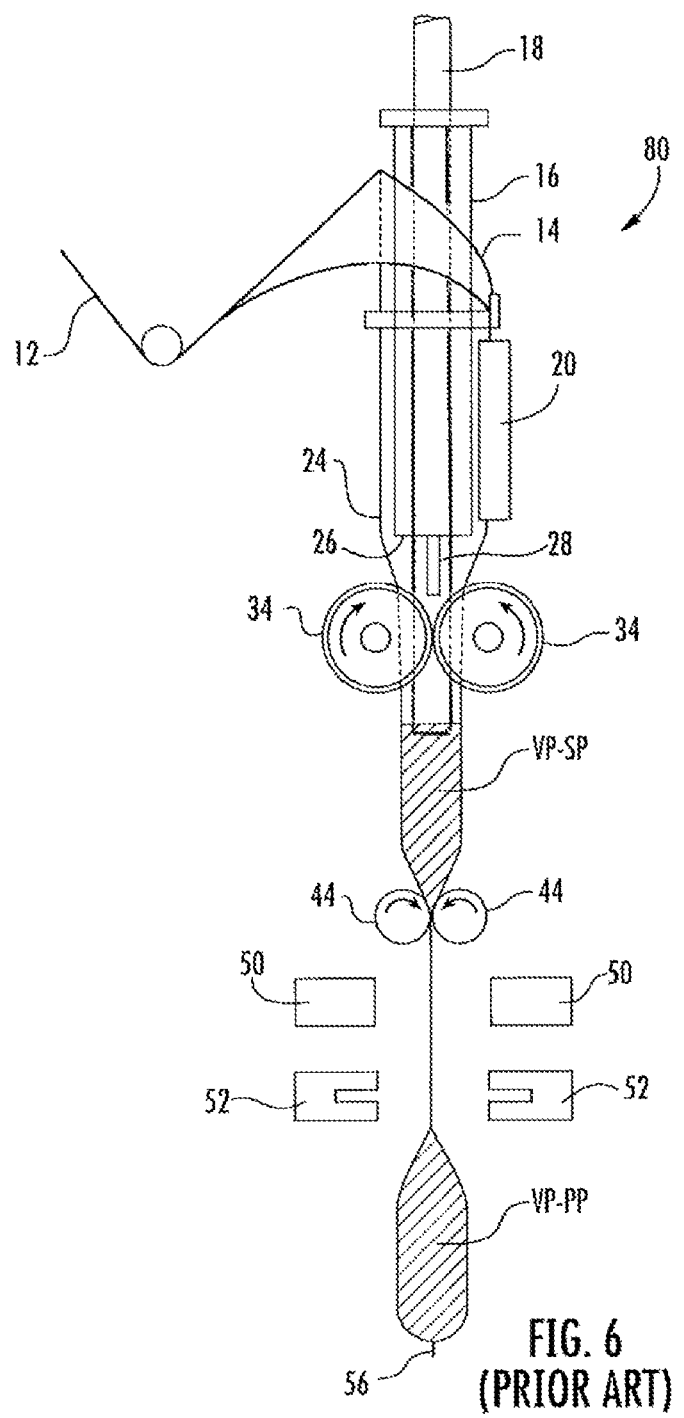
FIG. 6 is a side elevation view of a schematic of a prior art embodiment of a VFFS apparatus in a stage of a cyclic package forming and filling and sealing process.
Figure 7:
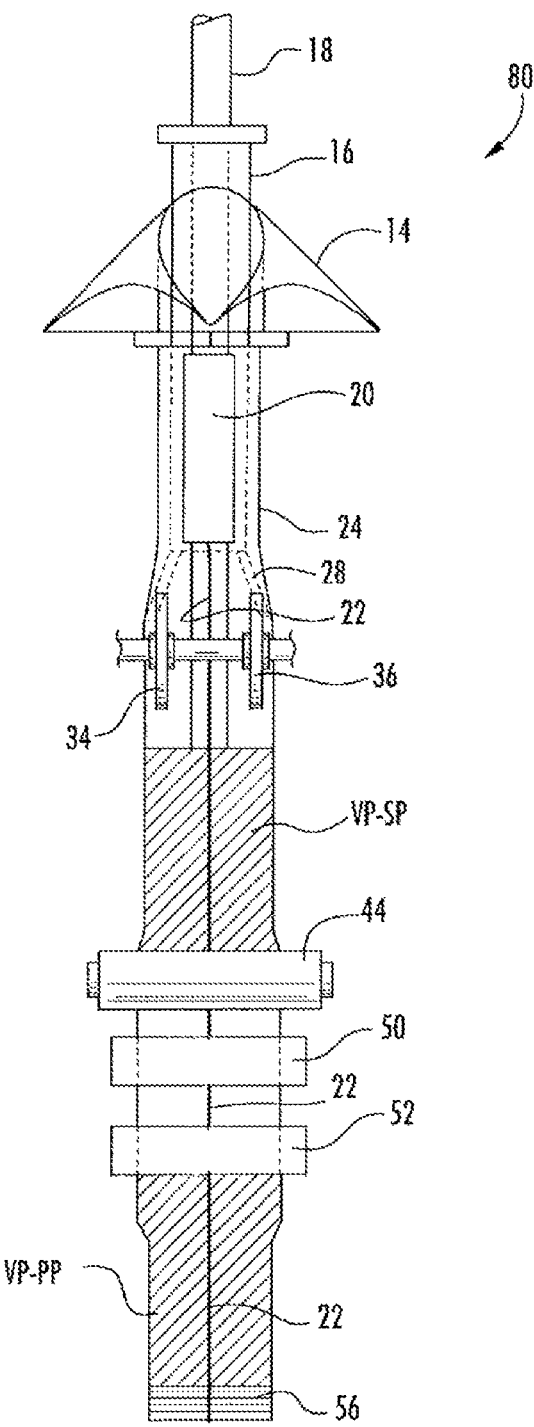
FIG. 7 is a front elevation view of the schematic of the prior art embodiment of the VFFS apparatus and process stage illustrated in FIG. 6.

FIGS. 6 and 7 illustrate side and front views, respectively, of a schematic of prior art vertical-form-fill-and-seal apparatus 80 in use, i.e., at an intermediate step in the cyclic package-forming and package-filling process corresponding with the process step illustrated in FIGS. 1 and 2. In FIGS. 6 and 7, packaging machine 80 is supplied with flat film 12 which passes through forming collar 14 and thereafter downwardly around forming pipe 16. Supply pipe 18 passes through forming pipe 16, and both forming pipe 16 and supply pipe 18 pass through forming collar 14. Flat film 12 is conformed into a tubular configuration around forming pipe 16, and heat sealer 20 is used to produce a longitudinal seal 22 of edge regions to one another, with the resulting longitudinally sealed tubing 24 proceeding downward and being somewhat flattened by spreader bar 28, following which the flattened film tubing 24 is forwarded through first and second pairs of drive wheels 34 and 36, respectively, with each of pairs of drive wheels 34 and 36 being in nip relationship. Supply pipe 18 extends into longitudinally sealed tubing 24 and through a second passageway between first pair of drive wheels 34 and second pair of drive wheels 36, as drive wheel pairs 34 and 36 only contact tubing edge regions 30 and 32, respectively. After longitudinally sealed tubing 24 passes through the nips between respective pairs of drive wheels 34 and 36, longitudinally sealed tubing 24 continues downward and through a nip between squeeze rollers 44. A pump pumps the non-viscous product NVP through supply pipe 18, which has discharge end above squeeze rollers 44, which are in nip relationship with sealed tubing 24 in lay-flat configuration therebetween, holding non-viscous product-supply portion NVP-SP from passing any further downward in tubing 24 until after sealing device 50 makes two transverse heat seals (or one wide heat seal) following which sealed tubing 24 is forwarded to cutter 52 which transversely severs the tubing 24 between the transverse seals made by sealing device 50, or through the middle of a wide seal made by sealing device 50, following which squeeze rollers 44 are opened up enough for non-viscous product-package portion to flow down to the transverse heat seal made across tubing 24. Squeeze rollers 24 are then closed and more non-viscous product NVP is discharged into tubing 24 by supply pipe 18 as sealed tubing 24 is further forwarded and transversely sealed again by sealing device 50, then further forwarded to cutter 52, wherein fully sealed package 82, containing the non-viscous product-product portion NVP-PP is severed from the strand of film tubing 24.

The apparatus and process of FIGS. 6 and 7 differs from the apparatus and process of FIGS. 1 and 2 in that the apparatus and process of FIGS. 6 and 7 is packaging a product which is readily flowable, i.e., a product which does not have a viscosity of at least 100,000 centipoise at standard conditions (i.e., 22° C., 1 atm, 50% relative humidity). Products having a viscosity of at least 100,000 centipoise at standard conditions do not readily flow, and without adequate manipulation when pumped into a film tubing leave substantial air pockets.

Ground meat (beef, pork, chicken, etc.) is such a product, i.e., ground meat has a viscosity ≥100,000 centipoise at standard conditions. When ground meat is pumped into the tubing of the apparatus of FIGS. 6 and 7 using the process described for forming and filling packages in accordance with FIGS. 6 and 7, even if the same length of tubing is used for each package, the result is packages having relatively large product weight variations. Moreover, the product inside the package contains air pockets, which is also undesirable aesthetically, and exposes the product to more oxygen than if air pockets are excluded from the package.

The apparatus of FIGS. 1, and 4 can be used to package products having a viscosity ≥100,000 centipoise and obtain much more uniform product weights than the apparatus of FIGS. 6 and 7. The product backflow blocking rollers in the apparatus of FIGS. 1 and 2 confines the product being pumped into the sealed tubing, and air out of the region between the squeeze rollers and the backflow blocking rollers because as the pump pumps more ground meat into the region of the film between the squeeze rollers and the backflow blocking rollers. The result is that for the packaging of a product which resists flowing and has a viscosity ≥100,000 centipoise at the packaging conditions, the amount of air in the package is reduced by the presence of the backflow blocking rollers, and the weight of product in the package is more consistent due to the presence of the backflow blocking rollers.

The flow-resistant, high viscosity product used in the process can have a viscosity at standard conditions of ≥100,000 centipoise, or ≥150,000 centipoise, or ≥200,000 centipoise, or ≥300,000 centipoise, or ≥400,000 centipoise, or ≥500,000 centipoise, or ≥600,000 centipoise, or ≥800,000 centipoise, or ≥1,000,000 centipoise; alternatively, the product can have a viscosity of from 100,000 to 5,000,000 centipoise, or from 125,000 to 2,000,000 centipoise, or from 150,000 to 1,500,000 centipoise, or from 200,000 to 1,400,000 centipoise, or from 250,000 to 1,200,000 centipoise, or from 30,000 to 1,000,000 centipoise, or from 400,000 to 800,000 centipoise.

The product to be packaged may comprise a member selected from the group consisting of ground meat (ground beef, ground pork, ground chicken), cookie dough, stuffing, batter, sandwich spread (e.g., pimento cheese), and dip (e.g., spinach dip), etc.

In an embodiment, the form-fill-and-seal process is carried out so that the amount of viscous product in the tubing is maintained at a level so that a discharge end of the supply pipe remains covered by the product (i.e., submerged in the product) throughout the entire cycle of the packaging process. In this manner, the viscous product pumped out the end of the supply pipe has less opportunity to trap air pockets in the tubing, thereby assisting in eliminating or reducing the presence of the air pockets in the packaged product, and assisting in obtaining uniform product weight in the packages made by the process.

The above description of apparatus 10 illustrated in FIGS. 1 and 2, as well as the above description of apparatus 58 illustrated in FIG. 4, include the presence and use of product backflow blocking rollers 36. Product backflow blocking rollers are but one example of a what is more generally a means for restricting upstream flow of a viscous product.

Figure 8:
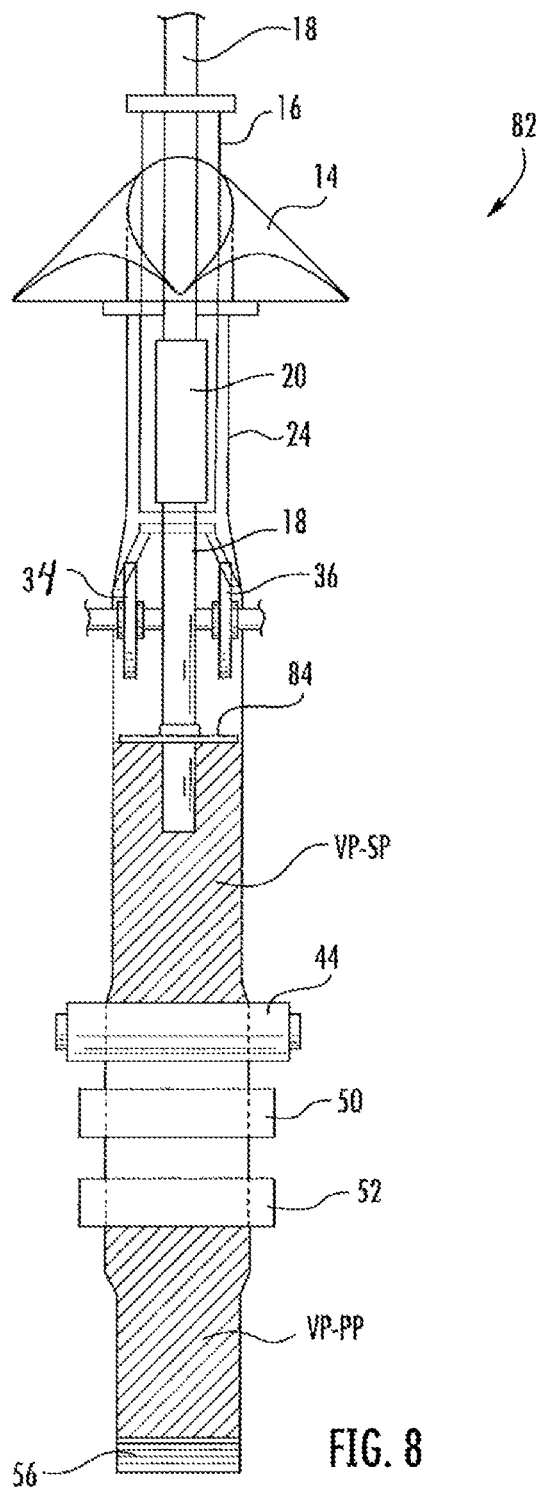
FIG. 8 is a front elevation view of a schematic of a third working embodiment of a VFFS apparatus employing a first alternative viscous product backflow restriction means.

FIG. 8 illustrates vertical form-fill-and-seal apparatus 82 having a first alternative means for restricting upstream flow of a viscous product in the tubing. In FIG. 8, reference numerals matching those in FIGS. 1 and 2 represent the same features disclosed in the description of FIGS. 1 and 2. It should be noted that VFFS apparatus 82 in FIG. 8 has no product backflow blocking rollers 36. Rather, VFFS apparatus 82 in FIG. 8 has a first alternative means for restricting upstream flow of the viscous product, in the form of product blocker 84 around supply pipe 18. Product blocker 84 is inside sealed tubing 24 and surrounds supply pipe 18.

As illustrated in FIG. 8, product blocker 84 is provided with an integral collar to assist in securing product blocker to supply pipe 18. Product blocker 84 has the shape of a washer, i.e., has an outer perimeter sized to match the size of film tubing 24, e.g., an outer perimeter sized to match a distance which is twice the lay-flat width of the film tubing. Product blocker 84 is provided with a passageway sized to allow passage of supply pipe 18 therethrough, but with a close enough fit to supply pipe 18 to prevent viscous product from squeezing between product blocker 84 and supply pipe 18.

Product blocker can be in a fixed position on supply pipe 18, or can be "floating" along supply pipe 18 between upper and lower stop means place either on supply pipe 18, or at any other suitable location. Product blocker 18 can be made of thick metal or other material so as to have enough weight to place a desired level of pressure on the viscous product in order to minimize the presence of air pockets within the viscous product.

Figure 9:
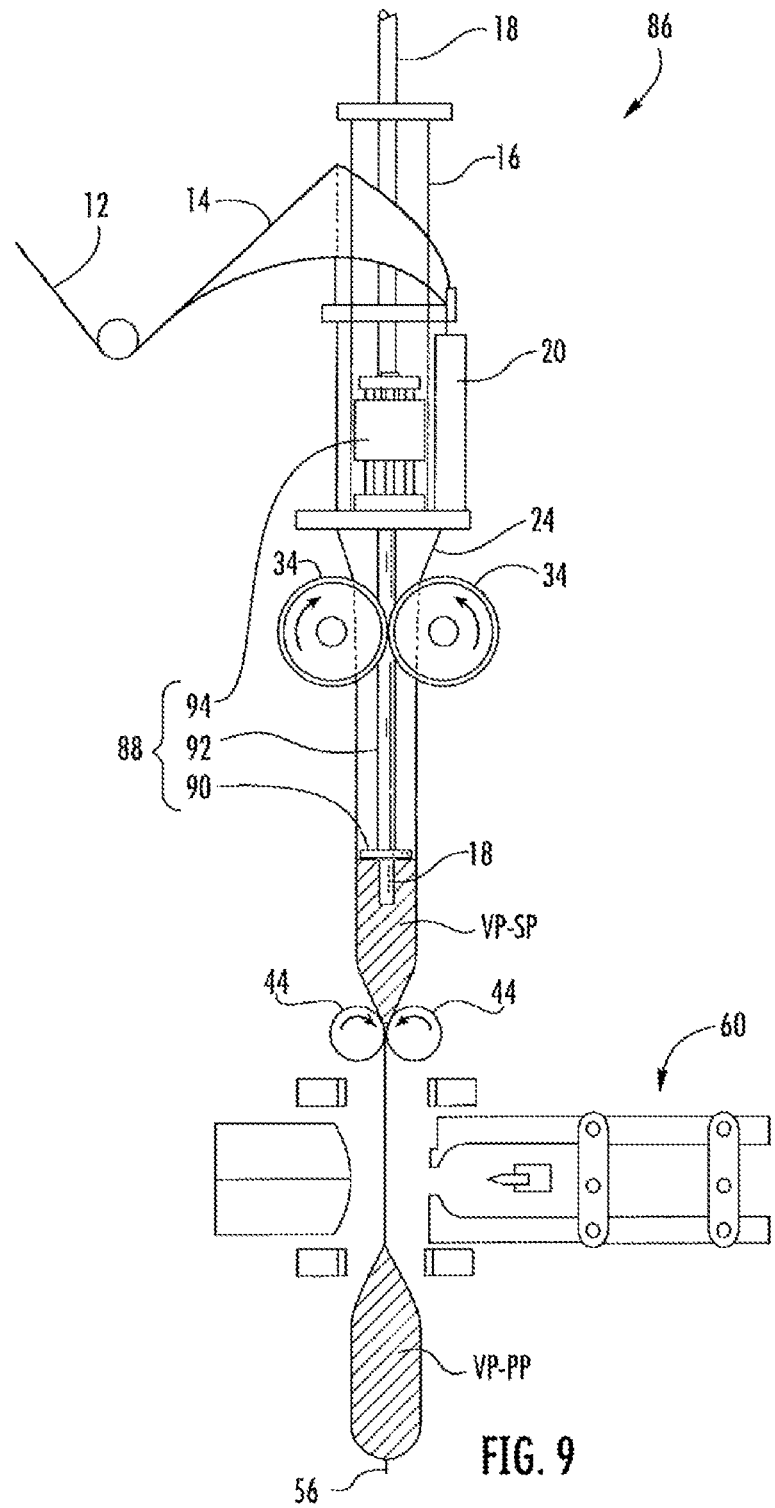
FIG. 9 is a side elevation view of a schematic of a fourth working embodiment of a VFFS apparatus employing a second alternative viscous product backflow restriction means.

FIG. 9 illustrates vertical form-fill-and-seal apparatus 82 having a second alternative means for restricting upstream flow of a viscous product in longitudinally sealed tubing 24. In FIG. 9, reference numerals matching those in FIG. 4 represent the same features disclosed in the description of FIG. 4. It should be noted that VFFS apparatus 86 in FIG. 9 also has no product backflow blocking rollers 36.

Figure 10:
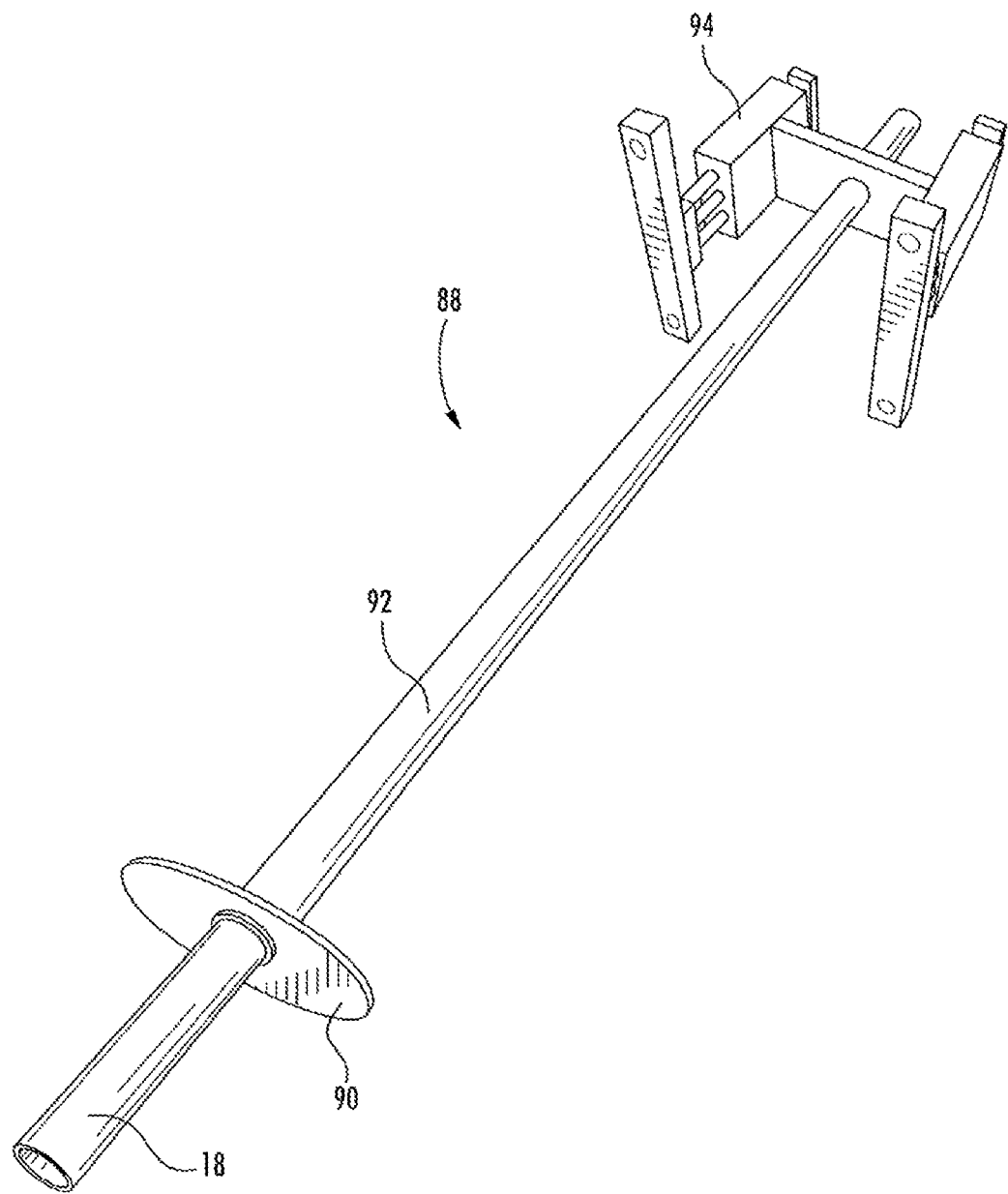
FIG. 10 is a perspective view of a product packing plunger assembly for present in the VFFS apparatus illustrated in FIG. 9.

Rather, in place of backflow blocking rollers 36, VFFS apparatus 86 in FIG. 9 has a second alternative means for restricting upstream flow of the viscous product: plunger assembly 88, which comprises the combination of plunger head 90 affixed to plunger pipe 92 which in turn is connected to plunger actuator 94. Plunger actuator 94 can advance and retreat plunger pipe 92 and plunger head 90 so as to move the viscous product toward the bottom of tubing 24, i.e., toward squeeze rollers 44. Plunger actuator 94 can be a pneumatic device (e.g., air cylinder), spring, hydraulic device (e.g., hydraulic piston), electromagnetic device (e.g., solenoid valve), etc. In operation, actuator 94 moves plunger shaft 92 so that plunger head 90 stuffs the viscous product into the tubing and thereby reduces the presence of air pockets within the viscous product, achieving a more uniform product weight in each resulting package. In the embodiment illustrated in FIG. 9, and as illustrated in FIG. 10, supply pipe 18 runs inside plunger pipe 92, in slidable engagement therewith.

Figure 11:
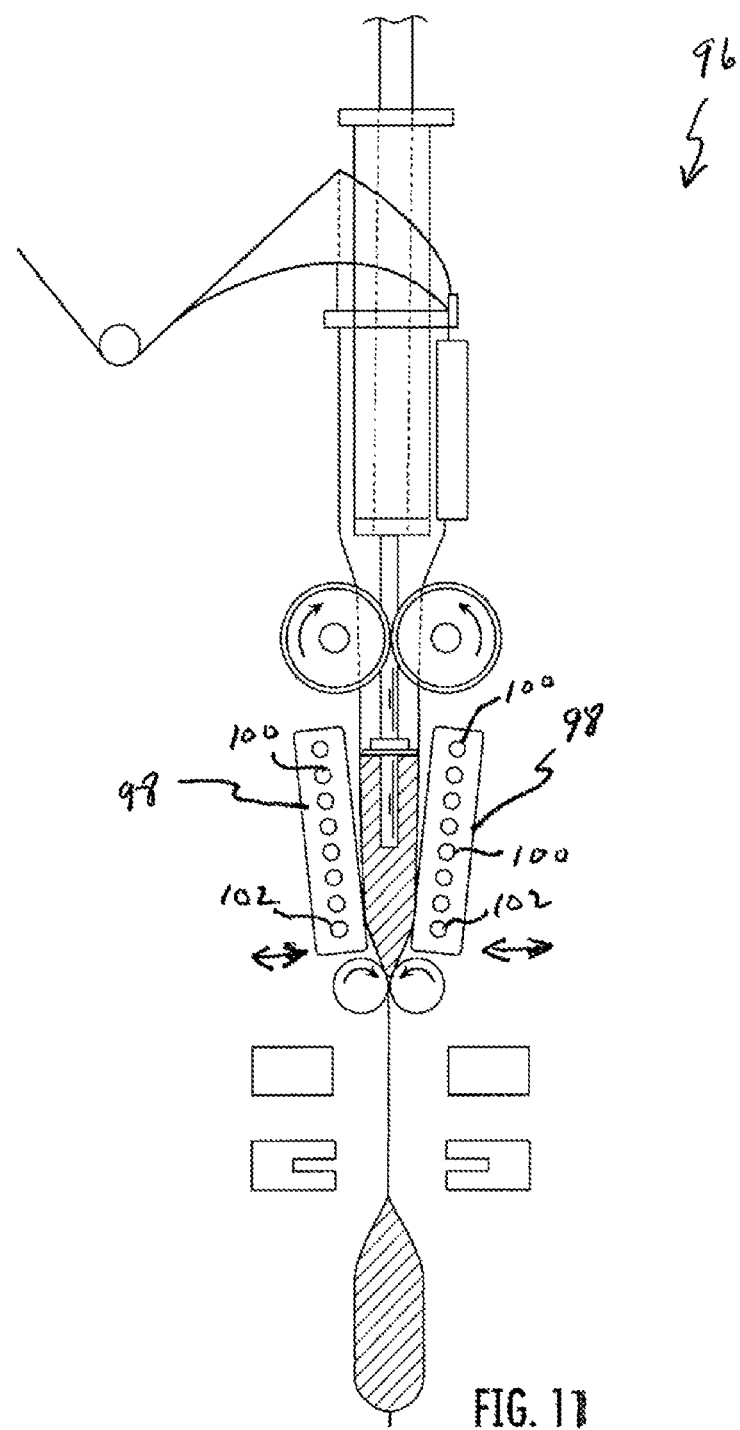
FIG. 11 is a side elevation view of a schematic of a fifth working embodiment of a VFFS apparatus employing an alternative set of squeeze rollers.

FIG. 11 illustrates a further embodiment of the invention employing gangs 98 of squeeze rollers 100, which pivot during the process cycle, with the lowest squeeze roller 102 coming into nip relationship upon full closing thereof. Although illustrated with product blocker as the means for restricting backflow, the gangs of squeeze rollers can be used with any of the means for restricting backflow.

Although certain preferred embodiments of the present invention have been shown and described in detail, it should be understood that various changes and modifications may be made therein without departing from the scope of the appended claims.

What is claimed is:

1. A cyclical process for packaging a viscous meat product in a clipless package, comprising:
   (A) forwarding a flat film from a rollstock, the flat film having a first lateral edge and a second lateral edge;
   (B) passing the flat film over a forming collar to configure the film into a tubing;
   (C) heat sealing together first and second portions of the flat film with a longitudinal heat sealer to form a longitudinally sealed tubing, the first and second portions being along the first and second lateral edges, respectively, with the forming collar having a first passageway therethrough;
   (D) forwarding the longitudinally sealed tubing to a transverse heat sealer and a transverse tubing cutter;
   (E) heat sealing across the longitudinally sealed film tubing with a transverse heat sealer, to make a package bottom transverse heat seal;
   (F) pumping the viscous meat product through a supply pipe extending through the first passageway, the supply pipe having a downstream end inside the longitudinally sealed film tubing, the viscous meat product emerging from the downstream end of the supply pipe and into the tubing, the viscous meat product having a viscosity ≥100,000 centipoise at standard conditions;
   (G) filling a portion of the longitudinally sealed film tubing with the viscous meat product during the pumping of the viscous meat product into the longitudinally sealed film tubing, the viscous meat product filling the tubing above the package bottom transverse heat seal to a point upstream of the downstream end of the supply pipe so that the downstream end of the supply pipe is submerged in the viscous meat product in order to minimize trapped air within the viscous meat product inside the film tubing;
   (H) restricting upstream movement of the viscous meat product at a point upstream of the downstream end of the supply pipe but downstream of the longitudinal heat sealer, the restricting being carried out by providing a means for restricting upstream flow of viscous meat product, with the means for restricting assisting in (i) minimizing air pockets inside the portion of the tubing filled with the viscous meat product, and (ii) minimizing the weight variation between a plurality of packaged products made using the tubing;
   (I) squeezing a meat-filled portion of the tubing with a pair of squeeze rollers, the squeeze rollers being moveable toward and away from the viscous meat product-filled tubing, the squeeze rollers contacting the viscous meat product-filled tubing between the downstream end of the supply pipe and the transverse heat sealer, the squeeze rollers being moved toward and contacting the outer surface of a meat-filled portion of the tubing and squeezing the viscous meat product-filled tubing into a lay-flat configuration with no viscous meat product between the lay-flat sides of the tubing where the squeeze rollers are in nip relationship, the squeeze rollers separating the viscous meat product into a package portion of viscous meat product downstream of the squeeze rollers, and a supply portion of viscous meat product upstream of the squeeze rollers;
   (J) forwarding the tubing while the squeeze rollers are in nip relationship with the tubing in lay-flat configuration between the squeeze rollers, to provide a portion of the tubing in lay-flat configuration below the squeeze rollers but above a package portion of viscous meat product which is in contact with the first transverse heat seal;
   (K) making a second transverse heat seal and a third transverse heat seal in the portion of the tubing in lay-flat configuration below the squeeze rollers but above the package portion of viscous meat product in the portion of the tubing below the squeeze rollers;
   (L) making a transverse cut across the tubing between the second transverse heat seal and the third transverse heat seal, thereby disconnecting a first viscous meat product-filled package from a remainder of the tubing;
   (M) moving the squeeze rollers away from the film tubing, with the supply portion of viscous meat product moving toward and contacting the third heat seal, with the supply portion of the viscous meat product being replenished by pumping additional viscous meat product through the supply pipe;
   (N) repeating a cycle of steps (F) through (M) in the making of a second package and the preparation of a third package wherein the means for restricting upstream flow of viscous meat product comprises a first restriction roller mounted on a frame in nip relationship with a second restriction roller mounted on the frame, with the lay-flat tubing therebetween, with at least one of the restriction rollers having a section of reduced diameter to allow passage of the supply pipe between the restriction rollers while the restriction rollers are in nip relationship the supply pipe being within the lay-flat tubing both upstream and downstream of the restriction rollers; at least one of the restricting rollers is moveable along an opening in the frame toward and away from the lay-flat tubing so that if any viscous meat product squeezes upstream past the restriction rollers, at least one of the restriction rollers is movable away from the lay-flat film tubing to allow the viscous meat product upstream of the restriction rollers to be forwarded as the film tubing is forwarded.

2. The process according to claim 1, wherein the film tubing travels vertically downward from the forming collar during packaging of the viscous meat product.

3. The process according to claim 1, wherein the downstream end of the supply pipe remains submerged in the viscous meat product throughout the repeating of the cycle of steps (F) through (M) in the making and severing of the second package and the preparation of the third package.

4. The process according to claim 1, wherein the rotation of at least one of the squeeze rollers is powered.

5. The process according claim 1, wherein the viscous meat product has a viscosity of from 100,000 centipoise to 5,000,000 centipoise at standard conditions, and the viscous meat product is.

6. An apparatus for packaging a product having a viscosity of ≥100,000 centipoise at standard conditions, the apparatus comprising:
(A) a forming collar for configuring a flat film into a tubing configuration, the forming collar providing a first passageway therethrough;
(B) a longitudinal heat sealer for making a longitudinal seal of the flat film to itself while the flat film is in the tubing configuration, to form a longitudinally sealed tubing;
(C) first and second pairs of powered wheels in nip relationship for forwarding the sealed tubing, with a second passageway between the first and second pairs of powered wheels;
(D) an upper transverse heat sealer for making a package bottom transverse seal, and a lower transverse heat sealer for making a package top transverse seal;
(E) a transverse tubing cutter between the upper transverse heat sealer and the lower transverse heat sealer;
(F) a means for restricting upstream flow of viscous meat product pumped into the tubing, the means for restricting upstream flow of the viscous meat product being between the powered rollers and the upper transverse heat sealer, the means for restricting upstream flow of the viscous meat product providing a third passageway therethrough,
(G) a supply pipe for pumping viscous meat product into the sealed tubing, the supply pipe extending through the first passageway, the second passageway, and the third passageway, the supply pipe having an open downstream end which is downstream of the means for restricting the flow of the viscous meat product;
(H) a pair of squeeze rollers transverse to the sealed tubing, the squeeze rollers being moveable toward and away from the tubing, the squeeze rollers being downstream of the downstream end of the supply pipe and upstream of the upper transverse heat sealer, the squeeze rollers being movable into nip relationship with one another with the longitudinally sealed tubing therebetween
wherein the means for restricting upstream flow of viscous meat product comprises a first restriction roller mounted on a frame in nip relationship with a second restriction roller mounted on the frame, with at least one of the restriction rollers having a section of reduced diameter to provide the third passageway while the restriction rollers are in nip relationship; at least one of the restricting rollers is moveable along an opening in the frame toward and away from the lay-flat tubing so that if any viscous meat product squeezes upstream past the restriction rollers, at least one of the restriction rollers is movable out of the nip relationship relative to the other restriction roller to allow the viscous meat product upstream of the restriction rollers to be forwarded as the sealed tubing is forwarded.

7. The apparatus according to claim 6, wherein the apparatus is designed for downward vertical movement of the film as it is longitudinally sealed, filled with viscous meat product, and transversely sealed.

8. The apparatus according to claim 6, wherein the apparatus is designed for horizontal movement of the film as it is longitudinally sealed, filled with viscous meat product, and transversely sealed.

\* \* \* \* \*